(12) United States Patent
Ichikawa

(10) Patent No.: US 7,179,516 B2
(45) Date of Patent: Feb. 20, 2007

(54) HONEYCOMB FILTER

(75) Inventor: Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 103 days.

(21) Appl. No.: 10/491,163

(22) PCT Filed: Oct. 7, 2002

(86) PCT No.: PCT/JP02/10401

§ 371 (c)(1),
(2), (4) Date: Mar. 30, 2004

(87) PCT Pub. No.: WO03/031023

PCT Pub. Date: Apr. 17, 2003

(65) Prior Publication Data

US 2004/0244344 A1 Dec. 9, 2004

(30) Foreign Application Priority Data

Oct. 9, 2001 (JP) ............................. 2001-311437

(51) Int. Cl.
*B32B 3/12* (2006.01)
*B21D 39/00* (2006.01)
(52) U.S. Cl. ...................................... 428/116; 428/593
(58) Field of Classification Search ................ 428/116, 428/117, 34.4, 188, 73
See application file for complete search history.

(56) References Cited

U.S. PATENT DOCUMENTS

| | | |
|---|---|---|
| 3,505,158 A | 4/1970 | Murray |
| 4,335,783 A | 6/1982 | McBrayer et al. |
| 5,914,187 A * | 6/1999 | Naruse et al. ............... 428/327 |

FOREIGN PATENT DOCUMENTS

| | | |
|---|---|---|
| EP | 0 816 065 A1 | 1/1998 |
| EP | 0 834 949 A2 | 4/1998 |
| EP | 1 142 619 A1 | 10/2001 |
| JP | 55-046338 | 4/1980 |
| JP | B2 61-51240 | 11/1986 |
| JP | A 01-145377 | 6/1989 |
| JP | A 08-028246 | 1/1996 |
| JP | A 2000-233979 | 8/2000 |
| JP | A 2001-162177 | 6/2001 |

OTHER PUBLICATIONS

Translation of JP 01-145377).*
Gulati, "Strength and Thermal Shock Resistance of Segmented Wall-Flow Diesel Filters," SAE Technical Paper Series, 86008, pp. 11-18, 1986.

* cited by examiner

*Primary Examiner*—Jennifer McNeil
*Assistant Examiner*—Gordon R. Baldwin
(74) *Attorney, Agent, or Firm*—Oliff & Berridge, PLC

(57) ABSTRACT

A honeycomb filter 1 is constituted by integrating a plurality of honeycomb segments 12 including a large number of through channels 3 partitioned by partition walls 2 and extending through an axial direction. The honeycomb filter 1 is characterized in that a thermal conductivity, strength, or strength/Young's modulus ratio of a honeycomb segment $12_I$ disposed in a central portion is high, or a porosity, average pore diameter, or (porosity×(average pore diameter)$^2$) of a wall portion is small with respect to a honeycomb segment $12_O$ disposed in an outer peripheral portion. The honeycomb filter is used in a filter or the like for capturing particulates in an exhaust gas, superior in regeneration efficiency, and capable of simultaneously achieving durability and low pressure loss.

4 Claims, 5 Drawing Sheets

FIG.1(a)
FIG.1(b)
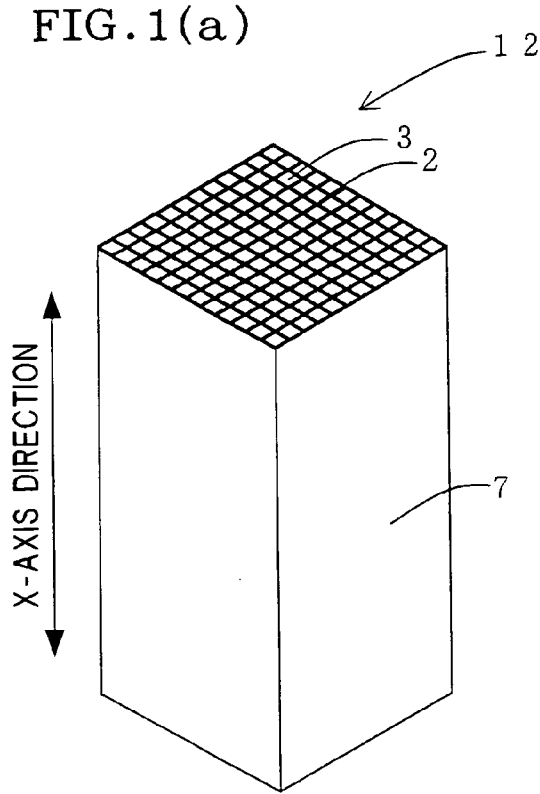
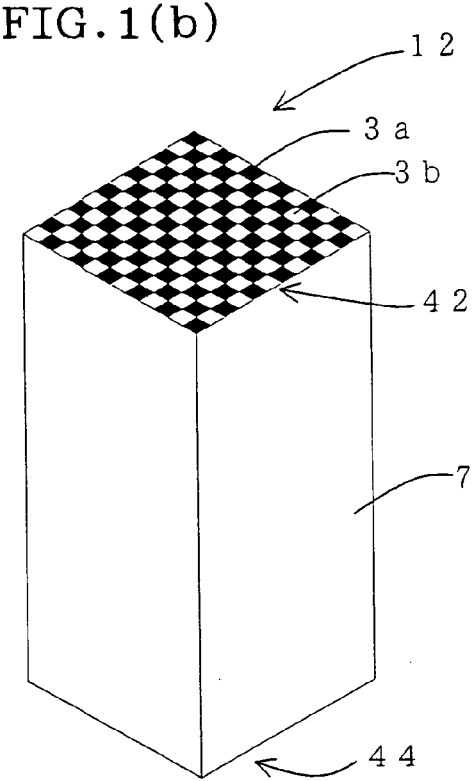
FIG.1(c)
FIG.1(d)
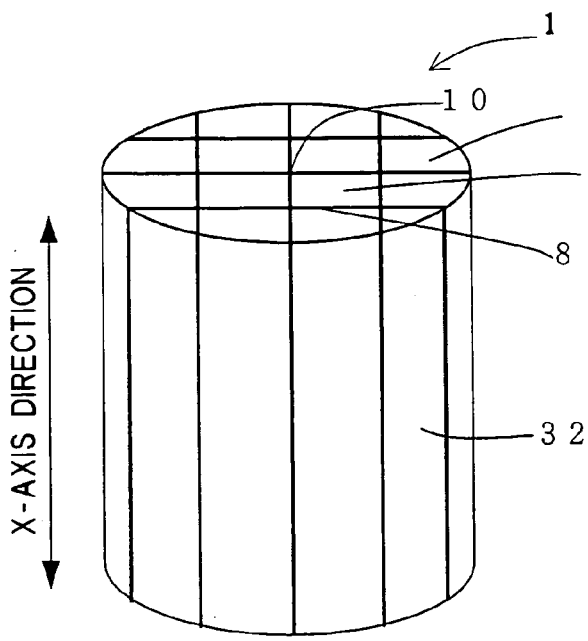
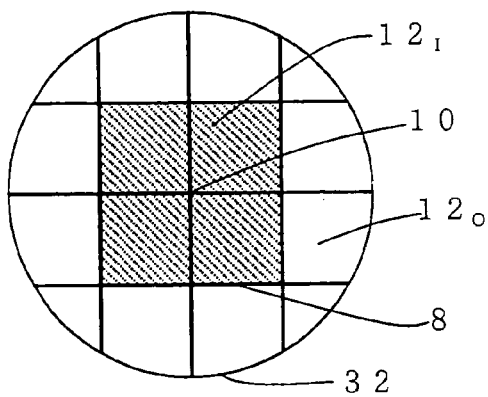

HONEYCOMB FILTER

TECHNICAL FIELD

The present invention relates to a honeycomb filter for use in exhaust gas purification devices of thermal engines such as an internal combustion engine or combustion devices such as a boiler, refinement devices of a liquid or gas fuel and the like, particularly to a honeycomb filter which is superior in regeneration efficiency and which is capable of simultaneously achieving durability and low pressure loss.

BACKGROUND ART

A honeycomb filter has been used in a capturing filter of particulates, particularly diesel particulates in an exhaust gas from an internal combustion engine, a boiler or the like.

In general, as shown in FIGS. 8(a), 8(b), the honeycomb filter for use in this purpose has a structure which includes a large number of through channels 3 partitioned by partition walls 2 and extending through an X-axis direction and in which the adjacent through channels 3 are plugged in one end alternately on opposite sides so that end surfaces have a checkered pattern. In the honeycomb filter having this structure, a fluid to be treated flows in the through channel 3 whose inlet end surface 42 is not plugged, that is, the through channel 3 whose outlet end surfaces 44 is plugged, passes through the porous partition wall 2, and is discharged via the adjacent through channel 3 whose inlet end surface 42 is plugged and whose outlet end surface 44 is not plugged. In this case, the partition walls 2 form the filter, and soot discharged, for example, from a diesel engine or the like is captured by and deposited on the partition walls. The honeycomb filter used in this manner has problems that a temperature distribution in the honeycomb structure becomes nonuniform by a rapid temperature change of an exhaust gas or a locally generated heat and that the honeycomb filter is cracked. Especially, with the use as the filter (hereinafter referred to as DPF) which traps a particulate material in the exhaust gas of the diesel engine, it is necessary to regenerate the filter by combusting and removing accumulated carbon particulates. In this case, there is a problem that temperature is locally raised, regeneration efficiency drops by unevenness of regeneration temperature, and cracks easily occur by a high heat stress. Since the temperature distribution during a regeneration is not uniform, it is difficult to set the whole filter at an optimum temperature and to enhance the regeneration efficiency.

To solve the problem, a method has been proposed in which a plurality of segments obtained by dividing the honeycomb filter are bonded by bonding materials. For example, in U.S. Pat. No. 4,335,783, a method of manufacturing a honeycomb structure has been described in which a large number of honeycomb members are bonded via discontinuous bonding materials. Moreover, Japanese Patent Publication No. 61-51240, a thermal shock resistant rotary heat accumulation system has been proposed in which matrix segments of the honeycomb structure formed of a ceramic material are extruded/formed and fired. Subsequently, an outer peripheral portion of the structure is processed and smoothed. Therefore, a bonded portion is coated with a ceramic bonding material whose mineral composition after the firing is substantially the same as that of the matrix segment and whose difference in coefficient of thermal expansion is 0.1% or less at 800° C., and fired. Moreover, in SAE paper 860008, 1986, a ceramic honeycomb structure has been described in which the honeycomb segments of cordierite are similarly bonded with cordierite cement. Further in Japanese Patent Application Laid-Open No. 8-28248, a ceramic honeycomb structure has been described in which a honeycomb ceramic member is bonded with an elastic seal material formed of inorganic fibers crossing one another in at least three dimensions, an inorganic binder, an organic binder, and inorganic particles. Moreover, a prevention against a honeycomb filter failure caused by a thermal stress has been attempted by preventing local temperature rise in the filter using a silicon carbide based material having high thermal conductivity and high thermal resistance.

Although the breakage by the thermal stress can be reduced to a certain degree by the segmented structure and/or the use of the materials high in thermal resistance such as a silicon carbide based material, a temperature difference between the outer peripheral portion and central portion of the honeycomb filter cannot be eliminated. Thus a improvement of the regeneration efficiency was insufficient due to insufficient achievement of uniform regeneration, and the heat was locally generated during a regeneration in some cases.

Although, the use of high in thermal conductivity material such as the silicon carbide based material is effective to prevent local temperature rise, the thermal conductivity and porosity of the material are essentially antithetical properties. Therefore, even with the use of the silicon carbide based material, when the porosity is raised in order to reduce a pressure loss as important properties of the filter, the thermal conductivity drops. That is, it has been difficult to simultaneously achieve the reduction of the thermal stress generated by the local heating during the filter regeneration and pressure loss.

DISCLOSURE OF THE INVENTION

The present invention has been developed in consideration of this circumstance, and an object thereof is to provide a honeycomb filter which is superior in regeneration efficiency and which is capable of simultaneously achieving high durability and low pressure loss.

As a result of intensive studies on the above-described problems, the present inventor has found that the problem can be solved by changing material properties of a honeycomb segment disposed in an outer peripheral portion and that disposed in a central portion in the honeycomb filter divided into the segments.

That is, according to the present invention, there is provided a honeycomb filter (hereinafter referred to as a segmented filter) in which a plurality of honeycomb segments including a large number of through channels partitioned by partition walls and extending through an axial direction are integrated, characterized in that with respect to the honeycomb segments disposed in an outer peripheral portion of the honeycomb filter, the honeycomb segments disposed in a central portion are high in at least one property selected from a group consisting of a thermal conductivity, a strength, and a strength/Young's modulus ratio and/or are small in at least one property selected from a group consisting of a porosity, pore diameter, and value represented by (porosity (%)×(average pore diameter (μm))$^2$) of a wall portion constituting the honeycomb segment.

According to a first aspect of the present invention, there is provided a honeycomb filter characterized in that the thermal conductivity of the honeycomb segment disposed in the central portion is high with respect to the honeycomb segment disposed in the outer peripheral portion of the segmented filter.

According to a second aspect of the present invention, there is provided a honeycomb filter characterized in that the strength of the honeycomb segment disposed in the central portion is high with respect to the honeycomb segment disposed in the outer peripheral portion of the segmented filter.

According to a third aspect of the present invention, there is provided a honeycomb filter which is the segmented filter and which is characterized in that the strength/Young's modulus ratio of the honeycomb segment disposed in the central portion is high with respect to the honeycomb segment disposed in the outer peripheral portion of the segmented filter.

According to a fourth aspect of the present invention, there is provided a honeycomb filter which is the segmented filter and which is characterized in that the porosity of a wall portion constituting the honeycomb segment disposed in the central portion is low with respect to a wall portion constituting the honeycomb segment disposed in the outer peripheral portion of the segmented filter.

According to a fifth aspect of the present invention, there is provided a honeycomb filter which is the segmented filter and which is characterized in that the average pore diameter of the wall portion constituting the honeycomb segment disposed in the central portion is small with respect to the wall portion constituting the honeycomb segment disposed in the outer peripheral portion of the segmented filter.

According to a sixth aspect of the present invention, there is provided a honeycomb filter which is the segmented filter and which is characterized in that a value represented by $A^O = B_O \times (C_O)^2$ is larger than a value represented by $A^I = B_I \times (C_I)^2$ in a case where the porosity of the wall portion constituting the honeycomb segment disposed in the outer peripheral portion of the segmented filter is $B_O$ (%), the average pore diameter is $C_O$ (μm), the porosity of the wall portion constituting the honeycomb segment disposed in the central portion of the segmented filter is $B_I$ (%), and the average pore diameter is $C_I$ (μm) (sixth aspect).

In the present invention, openings of predetermined through channels in the honeycomb filter are preferably plugged in one end surface and the openings of the remaining through channels are plugged in the other end surface, and the honeycomb segment having a vertical sectional area of 900 to 10000 mm² with respect to an axial direction is preferably included. Moreover, the honeycomb segment preferably contains a metal silicon—silicon carbide compound material or silicon carbide as a main component, and the honeycomb segments comprising two or more different compositions are preferably included. Furthermore, the honeycomb segment contains the metal silicon—silicon carbide compound material as the main component, and a silicon/silicon carbide mass ratio of the honeycomb segment disposed in the central portion of the honeycomb filter is preferably high with respect to the honeycomb segment disposed in the outer peripheral portion of the honeycomb filter.

BRIEF DESCRIPTION OF THE DRAWINGS

FIG. 1(a) is a schematic perspective view showing one form of a honeycomb segment according to the present invention, FIG. 1(b) is a schematic perspective view showing another form of the honeycomb segment according to the present invention, FIG. 1(c) is a schematic perspective view showing one form of a honeycomb filter of the present invention, FIG. 1(d) is a schematic plan view showing one form of the honeycomb filter of the present invention;

BEST MODE FOR CARRYING OUT THE INVENTION

Figure 2:
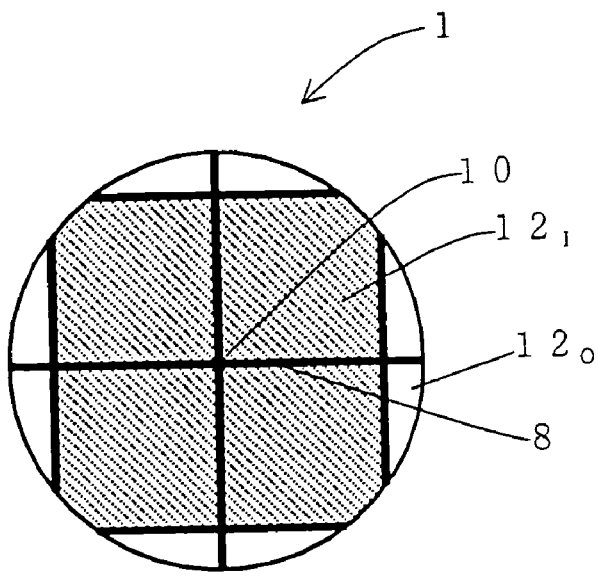
FIG. 2 is a schematic plan view showing another form in the honeycomb filter of the present invention.

A honeycomb filter of the present invention will be described hereinafter in detail with reference to the drawings, and the present invention is not limited to the following embodiment. It is to be noted that in the following a section means a section vertical to a through channel direction (X-axis direction) unless otherwise mentioned.

As shown in FIG. 1(a), the honeycomb filter of the present invention is constituted by integrating honeycomb segments 12 including a large number of through channels 3 partitioned by partition walls 2 and extending through an X-axis direction as shown in FIG. 1(c).

Important characteristics of a first aspect of the present invention are that honeycomb segments $12_I$ disposed in a central portion are high in thermal conductivity with respect to honeycomb segments $12_O$ disposed in an outer peripheral portion. Temperature does not sufficiently rise because of heat radiation to the outside in an outer peripheral portion of a conventional honeycomb filter, and combustion efficiency drops. Especially, with the use of materials high in thermal conductivity such as a silicon carbide based material, this phenomenon is remarkable. However, when the thermal conductivity of the honeycomb segment $12_O$ disposed in the outer peripheral portion is lowered, the heat radiation to the outside during a regeneration can be suppressed, and regeneration efficiency can be enhanced. On the other hand, temperature locally and easily rises in the central portion of the honeycomb filter during the regeneration, and breakage by a thermal stress easily occurs. However, when the thermal conductivity of the honeycomb segment $12_I$ disposed in the central portion is raised, the generation of the thermal stress is inhibited, and durability of a honeycomb filter 1 can rapidly be enhanced. The ratio of the thermal conductivity of the honeycomb segment $12_I$ disposed in the central portion with respect to the honeycomb segment $12_O$ disposed in the outer peripheral portion, thermal conductivity ($12_I$)/thermal conductivity ($12_O$) is preferably 1.05 to 10.0, further preferably 1.1 to 8.0, most preferably 1.2 to 5.0.

As described above, there are not any special restrictions to a method of raising the thermal conductivity of the honeycomb segment $12_I$ disposed in the central portion with respect to the honeycomb segment $12_O$ disposed in the outer peripheral portion as described above, but, for example, the porosity of the wall portion constituting the honeycomb segment can be changed, or the material can be changed to raise the conductivity. The porosity can be varied, for example, by changing an average particle diameter of a raw material aggregate of a prepared composition, a particle size distribution, a type or addition amount of a sintering auxiliary agent, or a type, amount, or particle diameter of a pore former, or by changing a forming pressure or firing schedule (temperature, keep time of maximum temperature, and the like) in a manufacturing process. Especially, when the metal silicon—silicon carbide compound material is the main component of the honeycomb segment, the metal silicon/silicon carbide mass ratio for use in the raw material can be changed to vary the porosity of the wall portion. For example, when the metal silicon/silicon carbide ratio for use in the raw material is increased, that is, when the amount of metal silicon is increased, sinterability of the wall portion is enhanced, and the porosity is reduced. Therefore, when the metal silicon/silicon carbide ratio of the honeycomb segment $12_O$ disposed in the outer peripheral portion is reduced, and the metal silicon/silicon carbide ratio of the honeycomb segment $12_I$ disposed in the central portion is increased, the constitution of the first aspect can be formed.

As shown in FIG. 1(c), the important characteristics of the second aspect of the present invention lie in that the strength of the honeycomb segment $12_I$ disposed in the central portion is high with respect to the honeycomb segment $12_O$ disposed in the outer peripheral portion. By this constitution, a thermal stress resistance only of the central portion in which breakage by a thermal stress easily occurs can be enhanced, and durability of the honeycomb filter 1 can efficiently be raised. Since the strength is also an opposed property with respect to the porosity in the same manner as in the thermal conductivity, the second aspect of the present invention can be used to simultaneously achieve the high durability and low pressure loss. A ratio of the strength of the honeycomb segment $12_I$ disposed in the central portion with respect to the honeycomb segment $12_O$ disposed in the outer peripheral portion, strength $(12_I)$/strength $(12_O)$, is preferably 1.05 to 10.0, further preferably 1.1 to 8.0, most preferably 1.2 to 5.0

There are not any special restrictions to a method for raising the strength of the honeycomb segment $12_I$ disposed in the central portion with respect to the honeycomb segment $12_O$ disposed in the outer peripheral portion, but, for example, the porosity of the wall portion constituting the honeycomb segment can be changed, or the material can be changed to perform the method. The porosity can be changed in a method similar to that described in the first aspect. The material high in strength is used in the honeycomb segment $12_I$ disposed in the central portion, and a material lower in strength is used in the honeycomb segment $12_O$ disposed in the outer peripheral portion so that the constitution of the second aspect can be formed.

The important characteristics of the third aspect of the present invention lie in that a strength/Young's modulus ratio of the honeycomb segment $12_I$ disposed in the central portion is high with respect to the honeycomb segment $12_O$ disposed in the outer peripheral portion as shown in FIG. 1(c). By this constitution, the thermal shock resistance of the honeycomb segment $12_O$ disposed in the central portion is enhanced, the thermal shock resistance only of the central portion in which the breakage by the thermal stress easily occurs can be enhanced, and the durability of the honeycomb filter 1 can efficiently be enhanced. The ratio of strength/Young's modulus ratio of the honeycomb segment $12_I$ disposed in the central portion with respect to the honeycomb segment $12_O$ disposed in the outer peripheral portion, {strength/Young's modulus ratio $(12_I)$}/{strength/Young's modulus ratio $(12_O)$}, is preferably 1.01 to 3.0, further preferably 1.05 to 2.5, most preferably 1.1 to 1.8.

There are not any special restrictions to a method for raising the strength/Young's modulus ratio of the honeycomb segment $12_I$ disposed in the central portion with respect to the honeycomb segment $12_O$ disposed in the outer peripheral portion, but, for example, the porosity of the honeycomb segment can be changed, or the material can be changed to perform the method. The porosity can be changed in the method similar to that described in the first aspect. The material high in the strength/Young's modulus ratio is used in the honeycomb segment $12_I$ disposed in the central portion, and the material low in the strength/Young's modulus ratio is used in the honeycomb segment $12_O$ disposed in the outer peripheral portion so that the constitution of the third aspect can be formed. For example, when the metal silicon/silicon carbide ratio for use in the raw material is increased, that is, the amount of metal silicon is increased, metal properties are remarkable, a value of Young's modulus decreases, and the strength/Young's modulus ratio increases. Therefore, the metal silicon/silicon carbide ratio of the honeycomb segment $12_O$ disposed in the outer peripheral portion is reduced, and the metal silicon/silicon carbide ratio of the honeycomb segment $12_I$ disposed in the central portion is increased so that the constitution of the third aspect can be formed.

The important characteristics of the fourth aspect of the present invention lie in that the porosity of the wall portion constituting the honeycomb segment $12_I$ disposed in the central portion is low with respect to the wall portion constituting the honeycomb segment $12_O$ disposed in the outer peripheral portion as shown in FIG. 1(c). By this constitution, the thermal conductivity, strength, and strength/Young's modulus ratio of the honeycomb segment $12_I$ disposed in the central portion can be simultaneously set to be higher than those of the honeycomb segment $12_O$ disposed in the outer peripheral portion. Moreover, since the porosity of the wall portion constituting the honeycomb segment $12_O$ disposed in the outer peripheral portion is high, the pressure loss of the whole honeycomb filter 1 can be reduced. The porosity can be changed in the method similar to that described in the first aspect. In the present invention, in accordance with the example of FIG. 1(a), the wall portion constituting the honeycomb segment means all partition walls 2 and side walls 7 constituting one honeycomb segment, and the porosity means the whole porosity of the partition walls 2 and side walls 7. The ratio of the porosity of the wall portion constituting the honeycomb segment $12_I$ disposed in the central portion with respect to that of the wall portion constituting the honeycomb segment $12_O$ disposed in the outer peripheral portion, porosity $(12_I)$/porosity $(12_O)$, is preferably 0.3 to 0.99, further preferably 0.4 to 0.95, most preferably 0.5 to 0.90.

The important characteristics of the fifth aspect of the present invention are that the wall portion constituting the honeycomb segment $12_I$ disposed in the central portion is small in average pore diameter with respect to the wall portion constituting the honeycomb segment $12_O$ disposed in the outer peripheral portion as shown in FIG. 1(c). By this constitution, it is possible to reduce the pressure loss in the outer peripheral portion, and the low pressure loss can be achieved in the whole honeycomb filter. In the present invention, in accordance with the example of FIG. 1(a), the average pore diameter of the wall portion constituting the honeycomb segment means an average of pore diameters of all the partition walls 2 and side walls 7 constituting one honeycomb segment. The ratio of the pore diameter of the wall portion constituting the honeycomb segment $12_I$ disposed in the central portion with respect to that of the wall portion constituting the honeycomb segment $12_O$ disposed in the outer peripheral portion, porosity ($12_I$)/porosity ($12_O$), is preferably 0.1 to 0.99, further preferably 0.2 to 0.97, most preferably 0.3 to 0.95.

The average pore diameter can be varied, for example, by changing the average particle diameter of the raw material aggregate, particle size distribution, or the types, amounts, or particle diameters of the sintering auxiliary agent and pore former. Especially when the metal silicon—silicon carbide compound material is the main component of the honeycomb segment, the metal silicon/silicon carbide mass ratio for use in the raw material can be changed to vary the average pore diameter. For example, when the metal silicon/silicon carbide ratio for use in the raw material is increased, the pore diameter can be reduced.

The important characteristics of the sixth aspect of the present invention are that, as shown in FIG. 1($c$), in a case where the porosity of the wall portion constituting the honeycomb segment $12_O$ disposed in the outer peripheral portion is $B_O$ (%), the average pore diameter is $C_O$ (µm), the porosity of the wall portion constituting the honeycomb segment $12_I$ disposed in the central portion of the honeycomb filter is $B_I$ (%), and the average pore diameter is $C_I$ (µm), a value represented by $A_O=B_O\times(C_O)^2$ is larger than a value represented by $A_I=B_I\times(C_I)^2$, that is, $A_O>A_I$. By this constitution, it is possible to reduce the pressure loss in the outer peripheral portion, and the low pressure loss of the whole honeycomb filter can be achieved. The ratio of $A_I$ to $A_O$, $A_I/A_O$, is preferably 0.01 to 0.98, further preferably 0.05 to 0.95, most preferably 0.1 to 0.90.

The honeycomb filter which satisfies the above-described relation is obtained by disposing the honeycomb segment, for example, whose wall portion is large in average pore diameter and porosity, and the reverse honeycomb segment in the central portion and the outer peripheral portion of the honeycomb filter, respectively, and each honeycomb segment can be obtained by the above-described method.

In the present invention, for the main component of the honeycomb filter 1, from standpoints of the strength, thermal resistance, and the like, at least one type of material selected from the group consisting of cordierite, mullite, alumina, spinel, silicon carbide, silicon carbide-cordierite based compound material, silicon—silicon carbide based compound material, silicon nitride, lithium aluminum silicate, aluminum titanate, Fe—Cr—Al based metal, and a combination of these is preferably the main component. However, from the viewpoint of the thermal resistance, the metal silicon—silicon carbide compound material or silicon carbide which is the main component is especially suitable for the honeycomb filter of the present invention. Here, the "main component" means that the component constitutes 50% by mass or more of the honeycomb filter, preferably 70% by mass or more, further preferably 80% by mass or more.

Moreover, to preferably obtain the honeycomb filters of the first to sixth aspects of the present invention, the honeycomb filter preferably includes the honeycomb segments having two or more different compositions. The honeycomb segment of the material high in one or more of properties such as the thermal conductivity, strength, and strength/Young's modulus ratio, and/or the material small in one or more of the properties such as the porosity, average pore diameter, and (porosity×(average pore diameter)$^2$) of the wall portion is disposed in the central portion, and the reverse honeycomb segment is preferably disposed in the outer peripheral portion. Here, the different compositions include not only the different compositions themselves but also different composition ratios.

Moreover, in the present invention, when the honeycomb filter contains the metal silicon (Si)-silicon carbide (SiC) compound material as the main component, an Si/SiC mass ratio of the honeycomb segment disposed in the central portion is set to be higher than that of the honeycomb segment disposed in the outer peripheral portion. Accordingly, it is very preferably possible to obtain the honeycomb filter which satisfies all the first to sixth aspects of the present invention.

In the present invention, in accordance with the examples of FIGS. 1($c$) and ($d$), the honeycomb segment disposed in the central portion refers to the honeycomb segment including a sectional center 10 of the honeycomb filter or adjacent to the sectional center 10, and the honeycomb segment whose all side surfaces contact another honeycomb segment, that is, the honeycomb segment which does not constitute the outermost peripheral surface of the honeycomb filter. The honeycomb segment disposed in the outer peripheral portion refers to the honeycomb segment which does not include the sectional center 10 of the honeycomb filter and which is not adjacent to the center and which substantially constitutes a part of an outermost peripheral surface 32 of the honeycomb filter. Here, the substantially constituting segment indicates that 20% or more of the honeycomb segment side surface constitutes the outermost peripheral surface of the honeycomb filter. Moreover, comparison of the honeycomb segment disposed in the central portion in the present invention with the honeycomb segment disposed in the outer peripheral portion in the thermal conductivity, the strength, the strength/Young's modulus ratio, and the porosity, average pore diameter, and (porosity×(average pore diameter)$^2$) of the wall portion means the comparison of the average of all the honeycomb segments disposed in the central portion with that of all the honeycomb segments disposed in the outer peripheral portion.

In the honeycomb filter 1 shown in FIGS. 1($c$) and ($d$), four honeycomb segments adjacent to the sectional center 10 of the honeycomb filter 1 are the honeycomb segments disposed in the central portion, and twelve honeycomb segments $12_O$ disposed around the central segments are honeycomb segments disposed in the outer peripheral portion. Therefore, as shown in FIGS. 1($c$) and ($d$), the honeycomb filter of the present invention has: a constitution in which any one or more properties such as the average thermal conductivity, strength, and strength/Young's modulus ratio of the four honeycomb segments $12_I$ are higher than those of twelve honeycomb segments $12_O$; and/or a constitution in which any one or more properties such as the average porosity, average pore diameter, and (porosity×(average pore diameter)$^2$) of the wall portions constituting the four honeycomb segments $12_I$ are lower than those of the wall portions constituting twelve honeycomb segments $12_O$.

There are not any special restrictions to the size of the honeycomb segment in the honeycomb filter of the present invention, but when each segment is excessively large, a problem of breakage by the thermal stress occurs. When each segment is excessively small, the integration of the respective segments by the manufacturing or the bonding is unfavorably laborious. Preferably for the size of the honeycomb segment, the sectional area is 900 mm$^2$ to 10000 mm$^2$, further preferably 900 mm$^2$ to 5000 mm$^2$, most preferably 900 mm$^2$ to 3600 mm$^2$. The honeycomb filter of the present invention preferably includes the honeycomb segments in this range. Further preferably 50% by volume or more, most preferably 70% by volume or more of the honeycomb filter comprises the honeycomb segments having this size. There are not any special restrictions to the shape of the honeycomb segment, for example, as shown in FIGS. 2 to 7, the sectional shape is a tetragonal shape, that is, the honeycomb segment having a square pole shape is regarded as a basic shape, and the shape of the honeycomb segment on an outer peripheral side can appropriately be selected in accordance with the shape of the integrated honeycomb filter.

In the present invention, there are not any special restrictions to a cell density (the number of through channels per unit sectional area). When the cell density is excessively small, the strength and effective geometric surface area (GSA) of the filter are insufficient. When the cell density is excessively large, the pressure loss in a case where the fluid to be treated flows increases. The cell density is in a range of preferably 6 to 2000 cells/square inch (0.9 to 311 cells/cm$^2$), further preferably 50 to 1000 cells/square inch (7.8 to 155 cells/cm$^2$), most preferably 100 to 400 cells/square inch (15.5 to 62.0 cells/cm$^2$). Moreover, there are not any special restrictions to the sectional shape (cell shape) of the through channel, but from a viewpoint in the manufacturing, any of triangular, tetragonal, hexagonal, and corrugated shapes is preferable.

In the present invention, the partition wall of the honeycomb filter is preferably a porous material which functions as the filter. There are not any special restrictions to the thickness of the partition wall. When the partition wall is excessively thick, the pressure loss during the transmission of the fluid to be treated through the porous partition wall is excessively large. When the partition walls are excessively thin, the strength of the filter is unfavorably insufficient. For the thickness of the partition wall, any of the partition wall thicknesses of the honeycomb segment disposed in the outer peripheral portion, the honeycomb segment disposed in the central portion, and the other honeycomb segments is in a range of preferably 30 to 2000 µm, further preferably 40 to 1000 µM, most preferably 50 to 500 µm.

Figure 3:
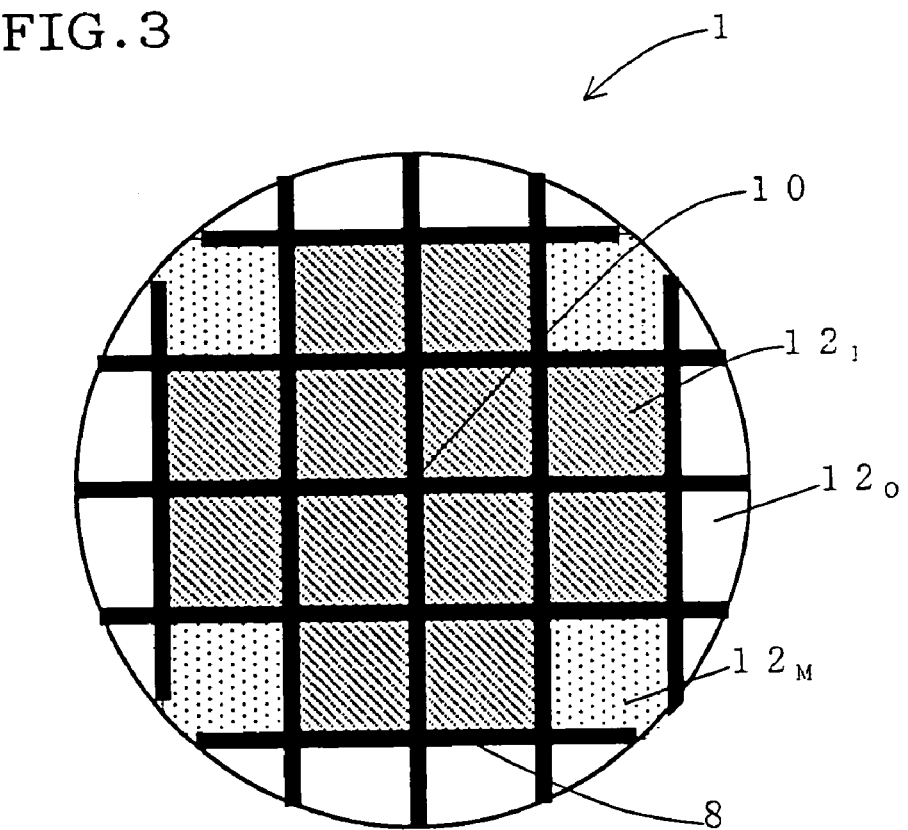
FIG. 3 is a schematic plan view showing still another form in the honeycomb filter of the present invention.
Figure 4:
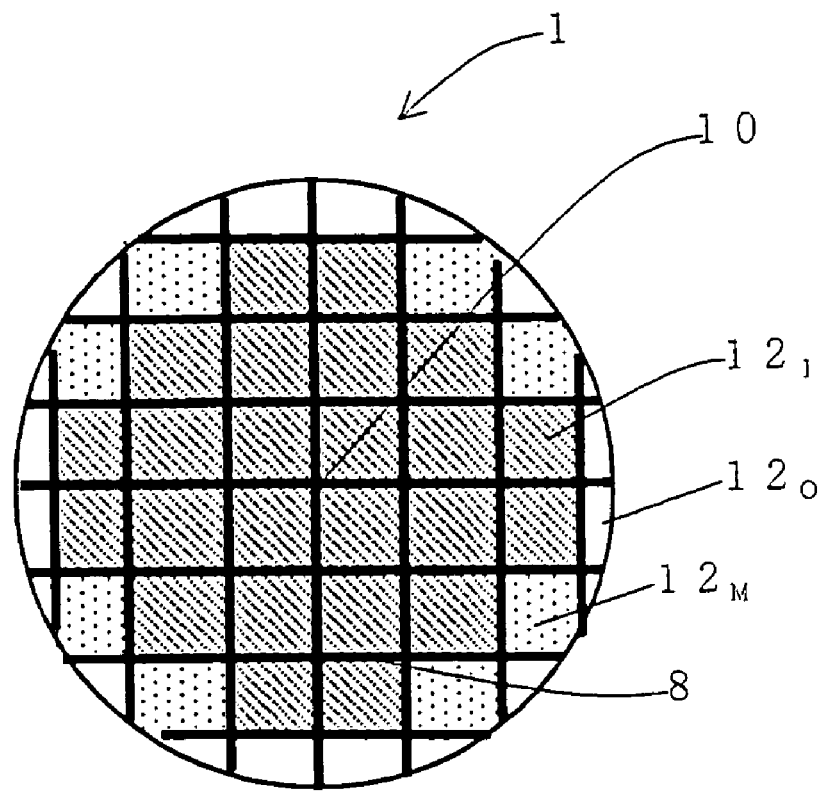
FIG. 4 is a schematic plan view showing still another form in the honeycomb filter of the present invention.
Figure 5:
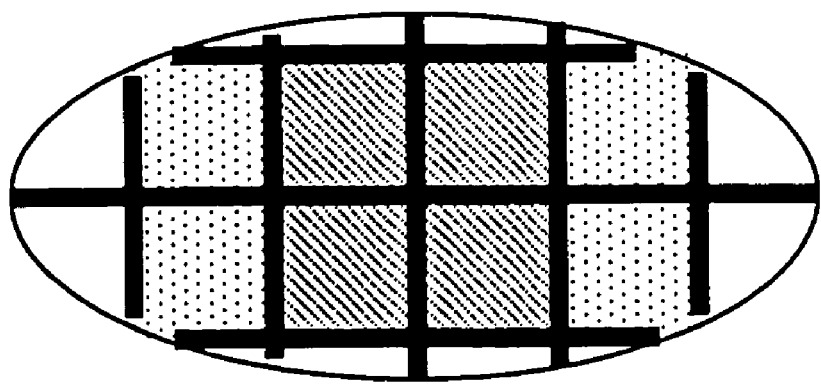
FIG. 5 is a schematic plan view showing still another form in the honeycomb filter of the present invention.
Figure 6:
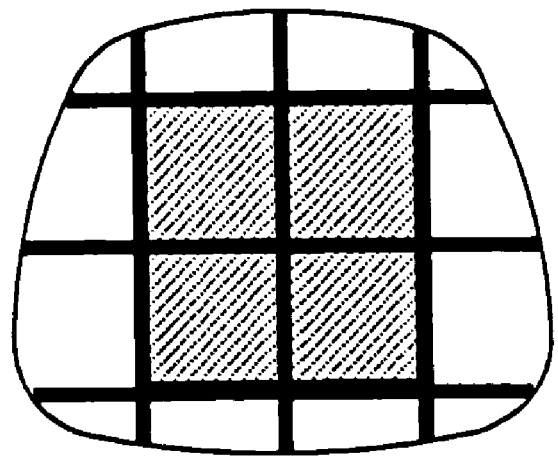
FIG. 6 is a schematic plan view showing still another form in the honeycomb filter of the present invention.
Figure 7:
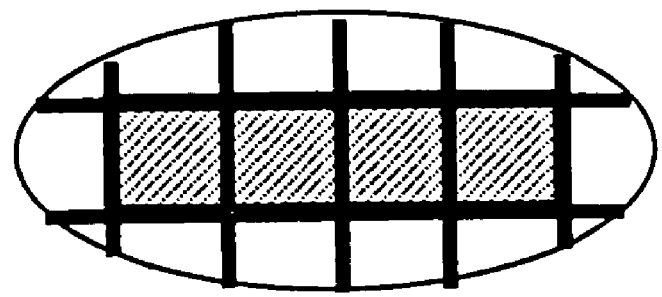
FIG. 7 is a schematic plan view showing still another form in the honeycomb filter of the present invention.
Figures 8A, 8B:
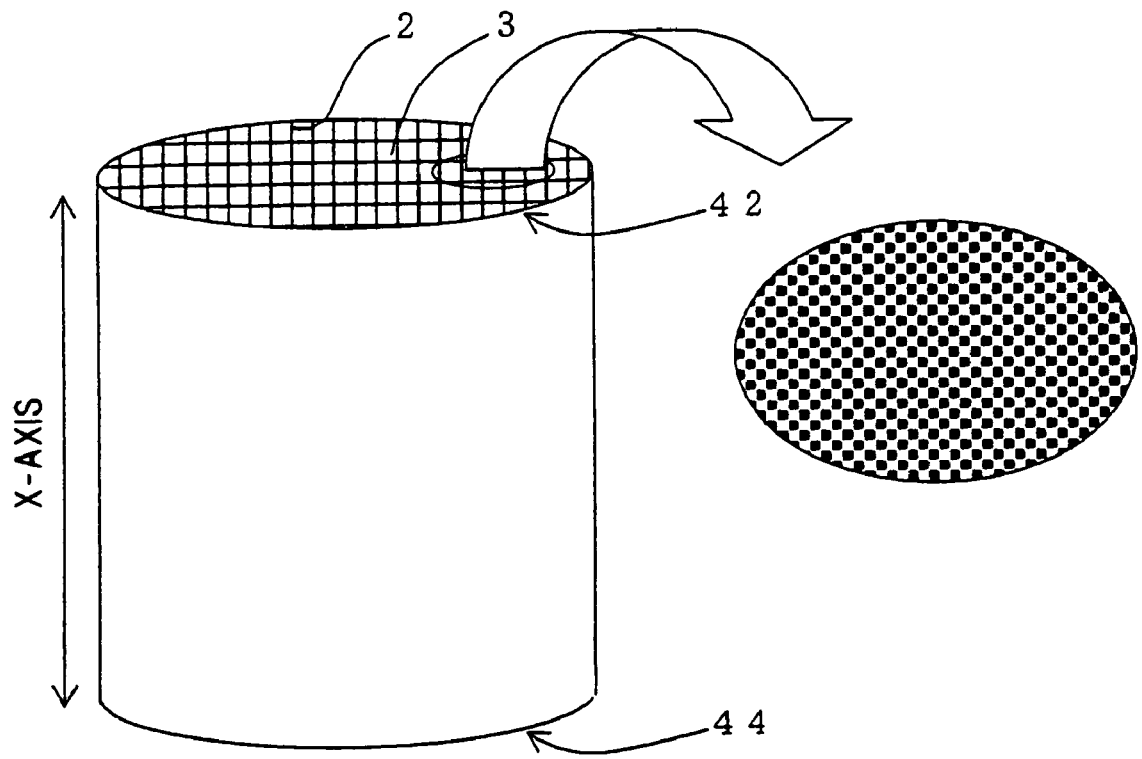
FIG. 8(a) is a schematic perspective view showing a conventional honeycomb filter.
FIG. 8(b) is a partially enlarged plan view.

FIGS. 2 to 7 show the honeycomb filters of the present invention having different forms, but in FIGS. 3, 4, a honeycomb segment $12_M$ which does not belong to the honeycomb segment $12_I$ disposed in the central portion or the honeycomb segment $12_O$ disposed in the outer peripheral portion. In this case, any of the properties of the honeycomb segment $12_M$, for example, the properties defined by the first to sixth aspects of the present invention, is preferably equal to that of $12_I$ or $12_O$, or between $12_I$ and $12_O$. The sectional shape of the honeycomb filter of the present invention is not especially limited, for example, a circular shape shown in FIG. 1, an elliptic shape shown in FIG. 5 or 7, an irregular shape shown in FIG. 6, additionally a race track shape, oblong shape, and polygonal shapes such as the triangular, substantially triangular, tetragonal, and substantially tetragonal shapes are possible.

The honeycomb filter of the present invention comprises a plurality of integrated honeycomb segments, but the segments may be integrated using a bonding material 8. The bonding material can preferably be selected from the materials preferably for use as the main component of the honeycomb filter, and cement containing a ceramic which is the main component is preferably used as a bond agent. Moreover, when a difference in the coefficient of thermal expansion between the bonding material 8 and the honeycomb segment 12 is excessively large, the thermal stress is unfavorably concentrated on the bonding portion at a heating/cooling time. The difference of the coefficient of thermal expansion between the bonding material and the honeycomb segment at 20° C. to 800° C. is preferably 1×10$^{-6}$/° C.

For the honeycomb filter of the present invention, as partially shown by the honeycomb segment 12 in FIG. 1(b), openings of predetermined through channels 3a are plugged in one end surface, and the remaining through channels 3b are preferably plugged in the other end surface. However, when the honeycomb filter of the present invention is used especially in DPF, the adjacent through channels 3a and 3b are preferably plugged in one end on the opposite sides so that end surfaces 42 and 44 have checkered patterns. For the material for use in the plugging, the material selected from ceramics or metals which are preferably usable in the above-described honeycomb segment is preferably usable. In this case, the honeycomb segments 12 plugged beforehand as shown in FIG. 1(b) may also be integrated, or the honeycomb segments may also be integrated and then plugged.

When the honeycomb filter of the present invention is used as a catalyst carrier in purifying an exhaust gas from thermal engines such as an internal combustion engine or combustion devices such as a boiler or in refining a liquid or gas fuel, the honeycomb filter of the present invention is preferably allowed to carry catalysts such as a metal having a catalyst ability. Examples of representative metals having the catalyst ability include Pt, Pd, Rh, and at least one type of these is preferably carried by the honeycomb filter.

Next, a method of manufacturing the honeycomb filter of the present invention will be described.

The preferable materials such as a silicon carbide powder are used as raw material powders of the honeycomb filter, binders such as methyl cellulose and hydroxypropoxyl methyl cellulose are added, and further a surfactant and water are added to prepare a clay. When the clay is extruded/formed, the honeycomb segment having a predetermined partition wall thickness and cell density is obtained.

After drying this, for example, by a microwave and hot air, the adjacent through channels are plugged in one end on the opposite sides with a material similar to that used in manufacturing the honeycomb filter so that the end surfaces have the checkered pattern. Further after drying, the material is heated/degreased, for example, in an N$_2$ atmosphere, and thereafter fired in inactive atmospheres such as Ar to obtain the honeycomb segments of the present invention. The obtained segments are bonded, for example, using the ceramic cement, and dried/hardened at 200° C. so that the honeycomb filter can be obtained.

A method of allowing the honeycomb filter manufactured in this manner to carry the catalyst may be a method usually performed by a person skilled in the art, and the catalyst can be carried, for example, by wash-coating, drying, and firing a catalyst slurry.

The present invention will be described concretely in accordance with examples hereinafter, but is not limited to the examples.

EXAMPLE AND COMPARATIVE EXAMPLE (Preparation of Honeycomb Segment)

As the raw materials, an SiC powder and metal Si powder, and polymethacrylic methyl which was the pore former were mixed at a mass ratio shown in Table 1, and methyl cellulose, hydroxypropoxyl methyl cellulose, surfactant, and water were added to this material to prepare a plastic clay. This clay was extruded/formed, and dried with the microwave and hot air to obtain a honeycomb segment having a partition wall thickness of 380 µm, cell density of about 31.0 cells/cm$^2$ (200 cells/square inch), and a square section with one 35 mm side and a length of 152 mm. Then, the adjacent through channels were plugged with the material similar to that used in manufacturing the honeycomb filter in one end on the opposite sides so that the end surfaces had the checkered pattern, and dried, degreased at about 400° C. in the atmosphere, and thereafter fired at about 1450° C. in an Ar inactive atmosphere to obtain honeycomb segments A, B, C, and D formed of the metal silicon—silicon carbide compound material of Si bonded SiC. The properties of the obtained honeycomb segments are shown in Table 2. The average pore diameter was measured in a mercury press-in method, and the porosity was measured in Archimedes method. The thermal conductivity was measured in a laser flash process in conformity to the method described in JIS R1611. A four-point bend strength and Young's modulus were measured in a method conforming to JIS R1601.

regenerated, an optical microscope was used to observe presence/absence of cracks in filter end surfaces, a test was stopped at occurrence time of the cracks, and a trapped soot amount was regarded as a limit soot amount. These results are shown in Table 3.

TABLE 3

|  | Central portion | Outer peripheral portion | Regeneration efficiency (%) | Pressure loss with soot (kPa) | Limit soot amount (g/L) |
|---|---|---|---|---|---|
| Example 1 | A | C | 90 | 11 | 14 |
| Example 2 | A | D | 95 | 12 | 14 |

TABLE 1

|  | SiC powder average particle diameter [μm] | SiC powder blend amount [parts by mass] | Metal Si average particle diameter [μm] | Metal Si blend amount [parts by mass] | Pore former average diameter [μm] | Pore former blend amount [parts by mass] |
|---|---|---|---|---|---|---|
| A | 32.6 | 80 | 4 | 20 | — | — |
| B | 50 | 70 | 4 | 30 | — | — |
| C | 32.6 | 80 | 4 | 20 | 60 | 20 |
| D | 50 | 80 | 4 | 20 | 12 | 15 |

TABLE 2

|  | Average pore diameter [μm] = C | Porosity [%] = (B) | 4-point bend strength [MPa] | Young's modulus [GPa] | Thermal conductivity [W/mK] | 4-point bend strength/Young's modulus [MPa/GPa] | Porosity (B) × (average pore diameter (C))$^2$ [% · μm$^2$] = (A) |
|---|---|---|---|---|---|---|---|
| A | 10 | 45 | 20 | 15 | 25 | 1.33 | 4500 |
| B | 15 | 40 | 35 | 25 | 35 | 1.40 | 9000 |
| C | 20 | 60 | 12 | 10 | 12 | 1.20 | 24000 |
| D | 17 | 55 | 15 | 12 | 15 | 1.25 | 16000 |

Examples 1 to 4 and Comparative Examples 1 to 4

As Examples 1 to 4 and Comparative Examples 1 to 4, by combinations shown in Table 3, four segments were disposed in the central portion, twelve segments were disposed in the outer peripheral portion, a mixture of alumino silicate fiber, silicon carbide powder, and silica gel with an inorganic binder was used to bond and dry/harden the segments at 200° C. Thereafter, by cutting the material, a columnar honeycomb filter for DPF having a diameter of 144 mm and a length of 152 mm was obtained as shown in FIG. 1(c), (d).

The DPFs prepared in Examples 1 to 4 and Comparative Examples 1 to 4 were connected to an exhaust tube of direct-injection type 3-liter diesel engine, a light oil containing 30 ppm of Ce fuel additive manufactured by Rodia Co. was used to run an engine, a 5 g/liter (L) of soot was accumulated in the filter, and the pressure loss was measured. Subsequently, the temperature of the honeycomb filter was raised at 600° C. with a propane gas burner, and oxygen concentration in the honeycomb filter was set to 18% by switching a bypass valve to start the regeneration treatment of the soot. The temperature was raised at 150° C. five minutes after the start of the regeneration treatment of soot, and thereafter a weight of soot was measured to calculate regeneration efficiency.

Furthermore, a trapped soot amount was increased every 2 g/liter (L) from 4 g/liter (L), the filter was similarly TABLE 3-continued

|  | Central portion | Outer peripheral portion | Regeneration efficiency (%) | Pressure loss with soot (kPa) | Limit soot amount (g/L) |
|---|---|---|---|---|---|
| Example 3 | B | C | 92 | 12 | 16 |
| Example 4 | B | D | 96 | 13 | 16 |
| Comparative Example 1 | A | A | 78 | 16 | 8 |
| Comparative Example 2 | B | B | 74 | 19 | 10 |
| Comparative Example 3 | C | A | 70 | 16 | 4 |
| Comparative Example 4 | D | A | 68 | 15 | 6 |

The honeycomb filters obtained in Examples 1 to 4 satisfy all the first to sixth aspects of the present invention, but it is seen that regeneration efficiency, pressure loss, and limit soot amount are apparently superior to those of the honeycomb filters obtained in Comparative Examples 1 to 4.

INDUSTRIAL APPLICABILITY

As described above, for a honeycomb filter of the present invention, since material properties of honeycomb segments disposed in an outer peripheral portion are different from those of the honeycomb segments disposed in a central portion, the honeycomb filter superior in regeneration efficiency and capable of simultaneously achieving durability and low pressure loss is obtained.

The invention claimed is:

1. A honeycomb filter constituted by integrating a plurality of honeycomb segments including a large number of through channels partitioned by partition walls and extending through an axial direction, wherein with respect to the honeycomb segments disposed in an outer peripheral portion of the honeycomb filter, the honeycomb segments disposed in a central portion are high in at least one property selected from a group consisting of a thermal conductivity, a strength, and a strength/Young's modulus ratio and/or are small in at least one property selected from a group consisting of a porosity, pore diameter, and value represented by (porosity (%)×(average pore diameter (μm))$^2$) of a wall portion constituting the honeycomb segment.

2. The honeycomb filter according to claim 1 wherein the thermal conductivity of the honeycomb segment disposed in the central portion is high with respect to the honeycomb segment disposed in the outer peripheral portion of the segmented filter.

3. The honeycomb filter according to claim 1 wherein the strength of the honeycomb segment disposed in the central portion is high with respect to the honeycomb segment disposed in the outer peripheral portion of the honeycomb filter.

4. The honeycomb filter according to claim 1 wherein the strength/Young's modulus ratio of the honeycomb segment disposed in the central portion is high with respect to the honeycomb segment disposed in the outer peripheral portion of the honeycomb filter.

* * * * *